(12) United States Patent
Izutani et al.

(10) Patent No.: US 9,586,614 B2
(45) Date of Patent: Mar. 7, 2017

(54) VEHICULAR STEERING SYSTEM

(71) Applicant: JTEKT CORPORATION, Osaka-shi, Osaka (JP)

(72) Inventors: Keisuke Izutani, Yamatotakada (JP); Tomonari Yamakawa, Hoi-gun (JP); Tomoya Yamatani, Toyota (JP)

(73) Assignee: JTEKT CORPORATION, Osaka-shi (JP)

(*) Notice: Subject to any disclaimer, the term of this patent is extended or adjusted under 35 U.S.C. 154(b) by 0 days.

(21) Appl. No.: 15/091,902

(22) Filed: Apr. 6, 2016

(65) Prior Publication Data

US 2016/0297468 A1    Oct. 13, 2016

(30) Foreign Application Priority Data

Apr. 13, 2015    (JP) .................. 2015-081883

(51) Int. Cl.
*B62D 5/00*    (2006.01)
(52) U.S. Cl.
CPC ............. *B62D 5/003* (2013.01); *B62D 5/001* (2013.01); *B62D 5/006* (2013.01)
(58) Field of Classification Search
CPC .................. B62D 5/003; B62D 5/006
USPC ........................ 180/443, 444, 446
See application file for complete search history.

(56) References Cited

U.S. PATENT DOCUMENTS

| 7,508,148 B2 * | 3/2009 | Kanda | B62D 6/008 |
| | | | 180/402 |
| 7,568,989 B2 * | 8/2009 | Naka | B62D 5/008 |
| | | | 475/28 |
| 7,726,439 B2 * | 6/2010 | Akuta | B62D 3/12 |
| | | | 180/402 |
| 2005/0072621 A1 * | 4/2005 | Hara | B62D 1/163 |
| | | | 180/444 |
| 2005/0288143 A1 * | 12/2005 | Menjak | B62D 5/008 |
| | | | 475/29 |
| 2008/0156572 A1 | 7/2008 | Kasahara et al. | |
| 2013/0253772 A1 * | 9/2013 | Tashiro | B62D 5/003 |
| | | | 701/43 |

FOREIGN PATENT DOCUMENTS

EP    2 851 267 A1    3/2015
JP    2014-218192 A    11/2014

OTHER PUBLICATIONS

Sep. 15, 2016 Extended European Search Report issued in European Patent Application No. 16 164 670.8.

* cited by examiner

*Primary Examiner* — Jacob Knutson
(74) *Attorney, Agent, or Firm* — Oliff PLC

(57) ABSTRACT

An ECU acquires a steering torque detected by a torque sensor (step S1). The ECU drives an electromagnet of a solenoid actuator (step S2). The ECU drives a steering operation motor in accordance with the direction of the detected steering torque acquired in step S1 to apply, to an output shaft of a clutch, a torque acting in such a direction that a torque being exerted on a clutch mechanism is reduced (step S3). When a predetermined time has elapsed since driving of the steering operation motor in step S3 (step S4: YES), the ECU 40 reverses a driving direction of the steering operation motor to apply, to the output shaft of the clutch, a torque acting in a direction opposite to the direction of the last torque applied (step S5).

6 Claims, 16 Drawing Sheets

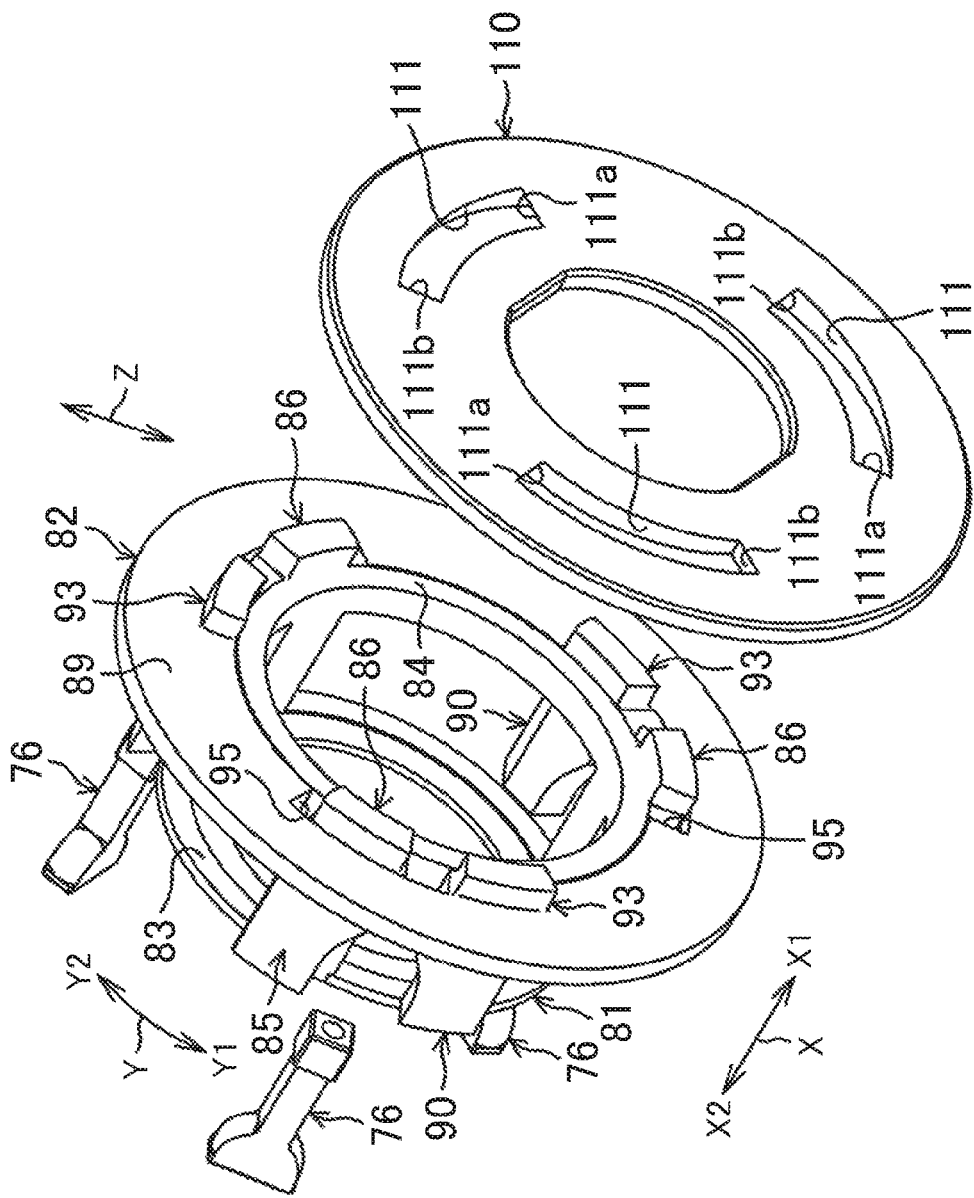

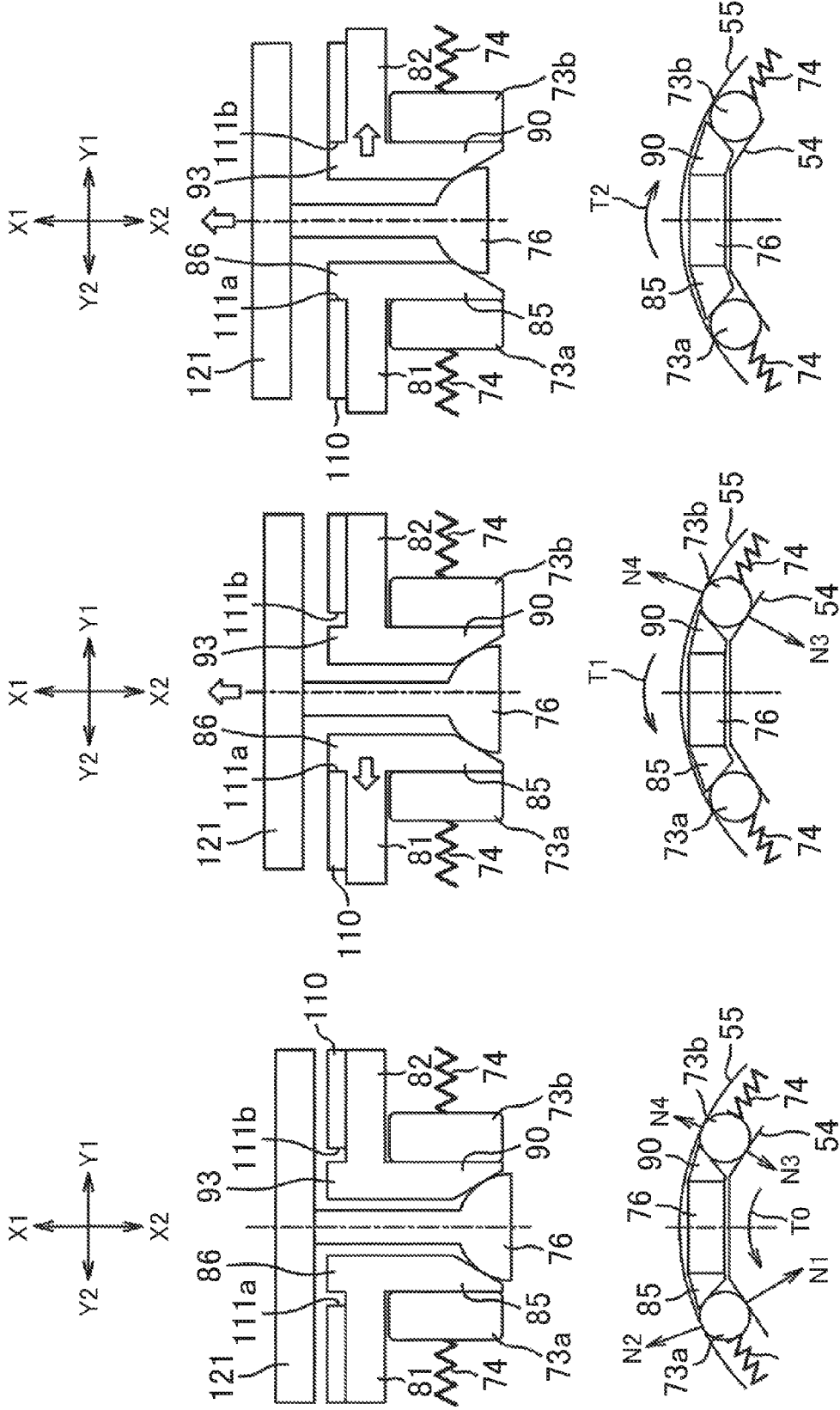

VEHICULAR STEERING SYSTEM

INCORPORATION BY REFERENCE

The disclosure of Japanese Patent Application No. 2015-081833 filed on Apr. 13, 2015 including the specification, drawings and abstract, is incorporated herein by reference in its entirety.

BACKGROUND OF THE INVENTION

1. Field of the Invention

The invention relates to a vehicular steering system used for vehicles such as automobiles.

2. Description of the Related Art

As vehicular steering systems, what is called steer-by-wire (SBW) vehicular steering systems are known in which a steering member and a steering operation mechanism are not mechanically coupled together. For example, Japanese Patent Application Publication No. 2014-218192 (JP 2014-218192 A) describes a steer-by-wire vehicular steering system in which a steering wheel serving as a steering member and a steering operation mechanism can be mechanically coupled together via a clutch. The clutch is normally released, and steering operation control is performed in a steer-by-wire mode (SBW mode). If any abnormality occurs while steering operation control is being performed in the steer-by-wire mode, the clutch is engaged and the steering operation control is performed in an electric power steering (EPS) mode.

The applicant has proposed a clutch that is suitable for mechanically coupling and decoupling the steering wheel to and from the steering operation mechanism. The clutch proposed by the applicant includes an input shaft, an output shaft, an inner ring, and an outer ring. The inner ring is coaxially and integrally coupled to the input shaft. The outer ring is coaxially and integrally coupled to the output shaft. The clutch proposed by the applicant further includes a clutch mechanism and a solenoid actuator. The clutch mechanism transmits and blocks a torque between the inner ring and the outer ring. The solenoid actuator has a function to generate an electromagnetic force that allows the clutch mechanism to be released. The solenoid actuator thus allows the clutch mechanism to be engaged and released.

When the clutch used for vehicular steering systems as described above is released from the engaged state, an excessive engaging force (frictional force) may be being applied to the clutch, for example, by operating the steering wheel. If an excessive engaging force is being applied to the clutch proposed by the applicant when the clutch is released from the engaged state, the frictional force, which prevents the release of the clutch, is increased, leading to the need for a high electromagnetic force exerted to release the clutch. Thus, an electromagnet with high output is needed, disadvantageously resulting in an increased size of the clutch and increased power consumption.

SUMMARY OF THE INVENTION

An object of the invention is to provide a vehicular steering system that enables a reduction in an electromagnetic force needed to release a clutch.

A vehicular steering system according to an aspect of the invention includes a steering member for steering a vehicle, a steering operation mechanism that allows steered wheels to be steered, a reaction force motor that applies a reaction force to the steering member, a steering operation motor that drives the steering operation mechanism, a motor control unit that controllably drives the reaction force motor and the steering operation motor, an input shaft coupled to the steering member, an output shaft coupled to the steering operation mechanism, a clutch mechanism that transmits and blocks a torque between the input shaft and the output shaft, a solenoid actuator that has a function to generate an electromagnetic force for releasing the clutch mechanism and allows the clutch mechanism to be engaged and released, and an actuator control unit that drives the solenoid actuator to generate an electromagnetic force for releasing the clutch mechanism. The motor control unit includes a unit that controllably drives at least one of the reaction force motor and the steering operation motor while the solenoid actuator is being driven by the actuator control unit, to alternately apply, to at least one of the input shaft and the output shaft, torques acting in two different directions in which the output shaft is rotated relative to the input shaft.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 5 is an exploded perspective view depicting a configuration of a part of the clutch mechanism;

FIG. 16A, FIG. 16B, and FIG. 16C are schematic diagrams illustrating operations of the clutch mechanism performed to release the clutch.

DETAILED DESCRIPTION OF EMBODIMENTS

An embodiment of the invention will be described below in detail with reference to the attached drawings.

Figure 1:
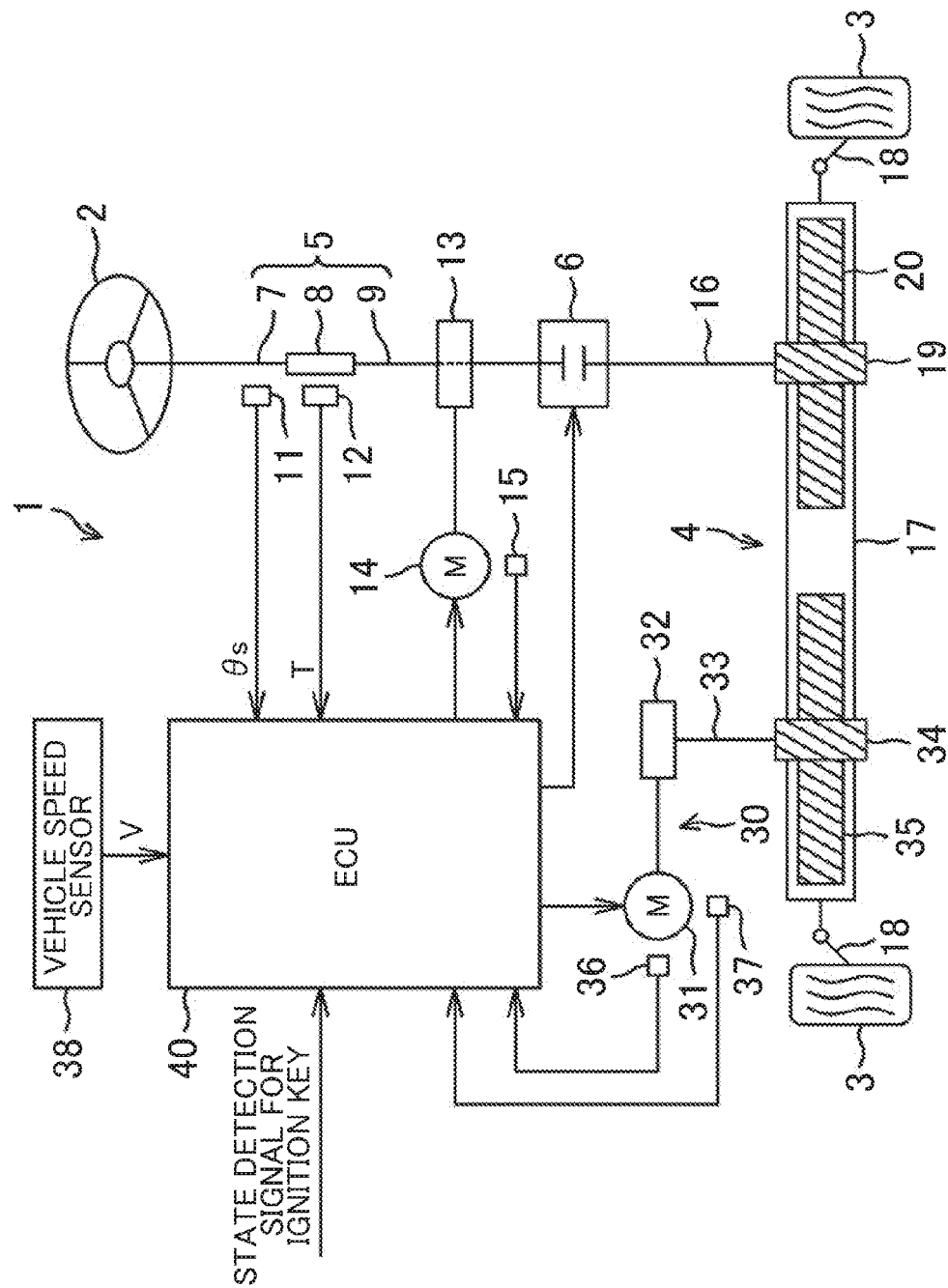
FIG. 1 is a schematic diagram depicting a general configuration of a vehicular steering system according to an embodiment of the invention.

FIG. 1 is a schematic diagram depicting a general configuration of a vehicular steering system according to an embodiment of the invention.

The vehicular steering system 1 includes a steering wheel 2, a steering operation mechanism 4, a steering shaft 5, and a clutch 6. The steering wheel 2 is a steering member that for steering a vehicle. The steering operation mechanism 4 steers steered wheels 3. The steering shaft 5 is coupled to the steering wheel 2. The clutch 6 mechanically couples and decouples the steering shaft 5 (steering wheel 2) to and from the steering operation mechanism 4. In the present embodiment, the clutch 6 is an electromagnetic clutch. The clutch 6 includes an input shaft 52 (see FIG. 2) and an output shaft 53 (see FIG. 2) and has a function to transmit and block a torque between the input shaft and the output shaft.

The steering shaft 5 includes a first shaft 7, a second shaft 9, and a torsion bar 8. The first shaft 7 is coupled to the steering wheel 2. The second shaft 9 is integrally coupled to the input shaft 52 of the clutch 6. The torsion bar 8 couples the first shaft 7 and the second shaft 9 together. Around the first shaft 7, a steering angle sensor 11 is arranged which allows detection of a steering angle θs that is a rotation angle of the first shaft 7. In the present embodiment, the steering angle sensor 11 detects the amount of rotation (rotation angle) of the first shaft 7 from a neutral position thereof in a forward direction and a backward direction. The amount of clockwise rotation from the neutral position is output, for example, as a positive value. The amount of counterclockwise rotation from the neutral position is output, for example, as a negative value.

A torque sensor 12 is arranged around the steering shaft 5. The torque sensor 12 detects a steering torque T applied to the steering wheel 2 based on relative-rotation displacements of the first shaft 7 and the second shaft 9, that is, a twist angle of the torsion bar 8. In the present embodiment, for the steering torque T detected by the torque sensor 12, a torque exerted for clockwise steering has a positive value. A torque exerted for counterclockwise steering has a negative value. The magnitude of the steering torque increases with an increase in the absolute value thereof.

A reaction force motor 14 is coupled to the second shaft 9 via a reduction gear 13. The reaction force motor 14 is an electric motor that allows a steering reaction force (a torque acting in a direction opposite to a steering direction) to be applied to the steering wheel 2. The reduction gear 13 is a worm gear mechanism including a worm shaft (not depicted in the drawings) and a worm wheel (not depicted in the drawings). The worm shaft is coupled to an output shaft of the reaction force motor 14 so as to be rotatable together with the output shaft of the reaction force motor 14. The worm wheel meshes with the worm shaft and is coupled to the second shaft 9 so as to be rotatable together with the second shaft 9. The reaction force motor 14 is provided with a rotation angle sensor 15 that allows the rotation angle of the reaction force motor 14 to be detected.

The steering operation mechanism 4 includes a first pinion shaft 16, a rack shaft 17, and a steering operation actuator 30. The first pinion shaft 16 is integrally coupled to the output shaft 53 of the clutch 6. The rack shaft 17 is a steering operation shaft. The steering operation actuator 30 applies a steering operation force to the rack shaft 17. Each of the steered wheels 3 is coupled to a corresponding end of the rack shaft 17 via a tie rod 18 and a knuckle arm (not depicted in the drawings). A first pinion 19 is coupled to a tip of the first pinion shaft 16. The rack shaft 17 extends linearly along a lateral direction of the automobile. At a first end of the rack shaft 17 in an axial direction, a first rack 20 is formed which meshes with the first pinion 19.

The steering operation actuator 30 includes a steering operation motor 31, a reduction gear 32, a second pinion shaft 33, a second pinion 34, and a second rack 35. The second pinion shaft 33 is arranged separately from the steering shaft 5. The reduction gear 32 is a worm gear mechanism including a worm shaft (not depicted in the drawings) and a worm wheel (not depicted in the drawings). The worm shaft is coupled to an output shaft of the steering operation motor 31 so as to be rotatable together with the output shaft of the steering operation motor 31. The worm wheel meshes with the worm shaft and is coupled to the second pinion shaft 33 so as to be rotatable together with the second pinion shaft 33.

The second pinion 34 is coupled to a tip of the second pinion shaft 33. The second rack 35 is provided at a second end of the rack shaft 17 in the axial direction that is on the opposite side of the rack shaft 17 from the first end. The second pinion 34 meshes with the second rack 35. The steering operation motor 31 is provided with a rotation angle sensor 36 that allows a rotation angle of the steering operation motor 31 to be detected. Near the rack shaft 17, a stroke sensor 37 is arranged which allows an axial moving distance of the rack shaft 17 to be detected. A steering operation angle θr of the steered wheels 3 is detected based on the axial moving distance of the rack shaft 17 detected by the stroke sensor 37.

An electronic control unit (ECU) 40 receives detection signals from the steering angle sensor 11, the torque sensor 12, the rotation angle sensors 15 and 36, the stroke sensor 37, and a vehicle speed sensor 38, and a state detection signal for the ignition key. Based on these input signals, the ECU 40 controls the clutch 6, the reaction force motor 14, and the steering operation motor 31. Specifically, the ECU 40 includes the clutch 6, driving circuits (not depicted in the drawings), and a microcomputer (not depicted in the drawings). The driving circuits deal with the reaction force motor 14 and the steering operation motor 31. The microcomputer controls the driving circuits.

The vehicular steering system 1 has, as its operation modes, a steer-by-wire mode (hereinafter referred to as an "SBW mode") and a fail safe mode. The SBW mode is a mode in which the steered wheels 3 are steered while the steering wheel 2 and the steering operation mechanism 4 are not mechanically coupled together (while the clutch 6 is released). The fail safe mode is a mode in which the steered wheels 3 are steered while the steering wheel 2 and the steering operation mechanism 4 are mechanically coupled together (while the clutch 6 is engaged). The fail safe mode is a mode automatically set when any abnormality occurs during the SBW mode. In the present embodiment, the fail safe mode is a power steering mode (EPS mode) in which at least one of the reaction force motor 14 and the steering operation motor 31 is used to generate a steering assist force corresponding to a steering torque or the like.

The fail safe mode may be a manual steering mode in which steering operations are only manually performed.

In the SBW mode, the ECU 40 controls the reaction force motor 14 and the steering operation motor 31, for example, based on the steering angle θs, the steering torque T, and the vehicle speed V. The steering angle θs is detected by the steering angle sensor 11. The steering torque T is detected by the torque sensor 12. The vehicle speed V is detected by the vehicle speed sensor 38. Specifically, the ECU 40 calculates a reaction torque target value based on the steering angle θs, the steering torque T, and the vehicle speed V. The ECU 40 controls the reaction force motor 14 so as to allow the reaction force motor 14 to generate a motor torque corresponding to the reaction torque target value. The ECU 40 calculates a steering operation angle target value based on the steering angle θs, the steering torque T, and the vehicle speed V. The ECU 40 controls the steering operation motor 31 so as to make the steering operation angle θr of the steered wheels 3 calculated from an output from the stroke sensor 37 equal to the steering operation angle target value.

In the EPS mode, the ECU 40 calculates a motor current command value corresponding to an assist torque target value, for example, based on the steering angle θs, the steering torque T, and the vehicle speed V. The ECU 40 controls the steering operation motor 31 (or the reaction force motor 14) so as to make a motor current flowing through the steering operation motor 31 (or the reaction force motor 14) equal to the motor current command value. The ECU 40 recognizes a state of an ignition key based on the state detection signal for the ignition key. The clutch 6 is engaged when the ignition key is not inserted into a key cylinder and when the ignition key is in an off position. When the ignition key is operated from the off position to an ACC (accessory) position, the steering wheel 2 is unlocked, whereas the clutch 6 remains engaged. When the ignition key is operated to the on position, the ECU 40 releases the clutch 6 and then shifts the operation mode to the SBW mode. When any abnormality occurs during the SBW mode, the ECU 40 engages the clutch 6 and then shifts the operation mode to the fail safe mode (in the present embodiment, the EPS mode). When the ignition key is operated from the on position to the off position, the ECU 40 engages the clutch 6.

The clutch 6 may be released when the ignition key is operated from the off position to the ACC position. For example, when the operation mode is shifted to the fail safe mode (in the present embodiment, the EPS mode) and then an abnormality having caused the shift of the operation mode is eliminated, the ECU 40 may release the clutch 6 and shifts the operation mode to the SBW mode.

Figure 2:
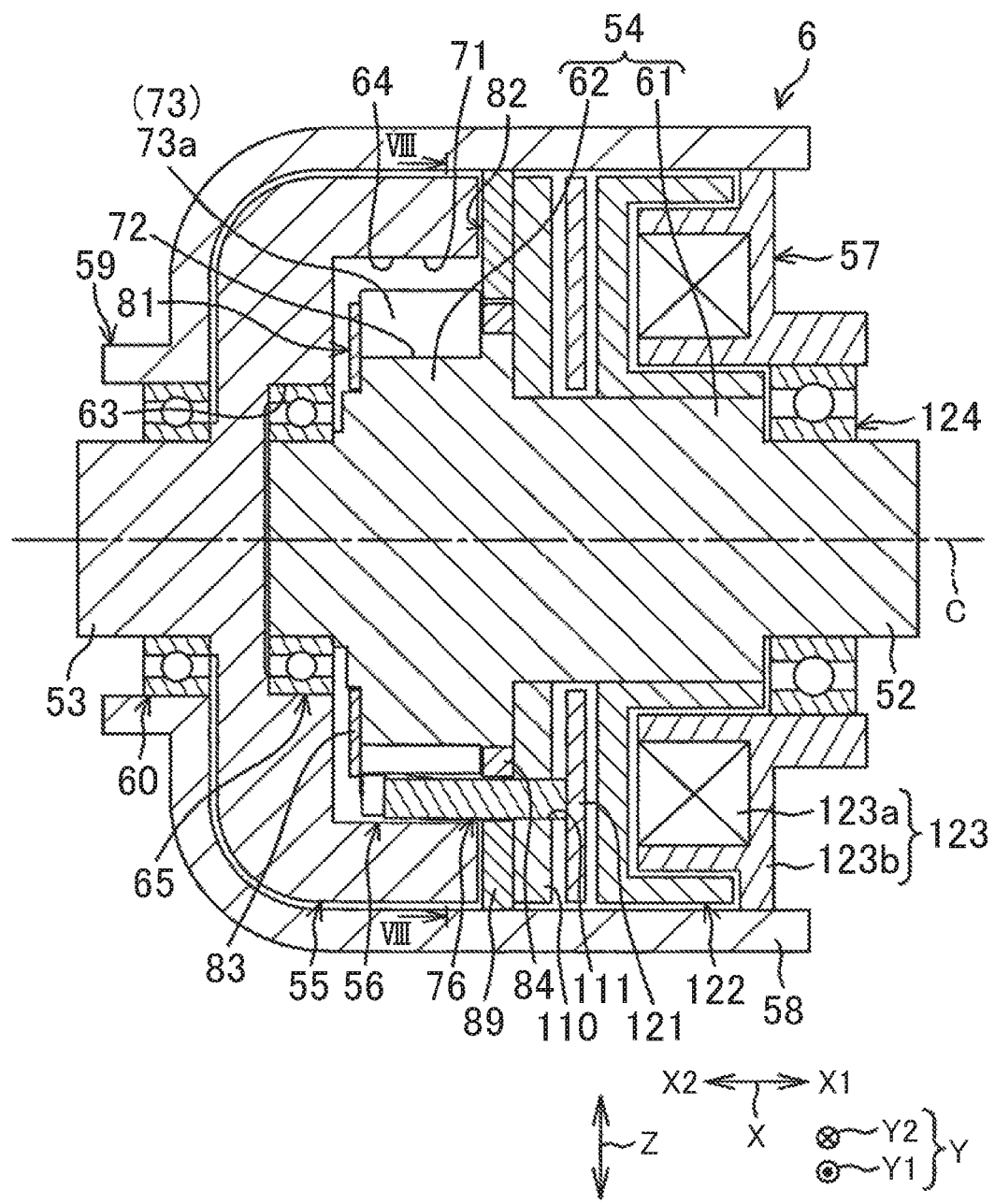
FIG. 2 is a sectional view depicting a configuration of a clutch.

A configuration of the clutch 6 will be described with reference to FIGS. 2 to 14. FIG. 2 is a sectional view depicting the configuration of the clutch 6. The clutch 6 includes the input shaft 52, the output shaft 53, an inner ring 54, and an outer ring 55. The inner ring 54 is coaxially and integrally coupled to the input shaft 52. The outer ring 55 is coaxially and integrally coupled to the output shaft 53. The clutch 6 includes a clutch mechanism 56 and a solenoid actuator 57. The clutch mechanism 56 transmits and blocks a torque between the inner ring 54 and the outer ring 55. The solenoid actuator 57 has a function to generate an electromagnetic force for releasing the clutch mechanism 56. The solenoid actuator 57 allows the clutch mechanism 56 to be engaged and released. The clutch 6 further includes a housing 58 that houses the inner ring 54, the outer ring 55, the clutch mechanism 56, and the solenoid actuator 57.

In the axial direction of a rotation axis C of the input shaft 52 and the output shaft 53 is hereinafter referred to as an axial direction X. A direction from the output shaft 53 toward the input shaft 52 in the axial direction X (rightward in FIG. 2) is referred to as an X1 direction. A direction from the input shaft 52 toward the output shaft 53 in the axial direction X (leftward in FIG. 2) is referred to as an X2 direction. A radial direction of the input shaft 52 and the output shaft 53 is referred to as a radial direction Z. A circumferential direction of the input shaft 52 and the output shaft 53 is referred to as a circumferential direction Y. In the circumferential direction Y, a clockwise direction as viewed from the output shaft 53 side toward the input shaft 52 is referred to as a Y1 direction and a counterclockwise direction as viewed from the output shaft 53 side toward the input shaft 52 is referred to as a Y2 direction.

The housing 58 is cylindrical and is provided with a bushing 59 at its X2 direction-side end. A first rolling bearing 60 is arranged between an inner peripheral surface of the bushing 59 and an outer peripheral surface of the output shaft 53. The output shaft 53 is supported by the housing 58 via the first rolling bearing 60 so as to be rotatable and to be immovable in the axial direction X. The inner ring 54 is made of, for example, a steel material. The inner ring 54 integrally includes a shaft portion 61 and a large-diameter portion 62. The large-diameter portion 62 is provided in a middle portion of the shaft portion 61 in the axial direction X. The outer ring 55 is shaped like a cylinder closed at its X2 direction-side end and is made of a steel material. The output shaft 53 is integrally coupled to the X2 direction-side end of the outer ring 55.

On an inner peripheral surface of the outer ring 55, a first annular step portion 63 and a second annular step portion 64 are formed in this order from the X2 direction-side end of the outer ring 55. The second annular step portion 64 has a larger diameter than the first annular step portion 63. A second rolling bearing 65 is arranged between an inner peripheral surface of the first annular step portion 63 and an outer peripheral surface of the input shaft 52. An X2 direction-side end of the input shaft 52 is supported by the outer ring 55 via the second rolling bearing 65 so as to be rotatable relative to the outer ring 55 and to be immovable relative to the outer ring 55 in the axial direction X.

Figure 3:
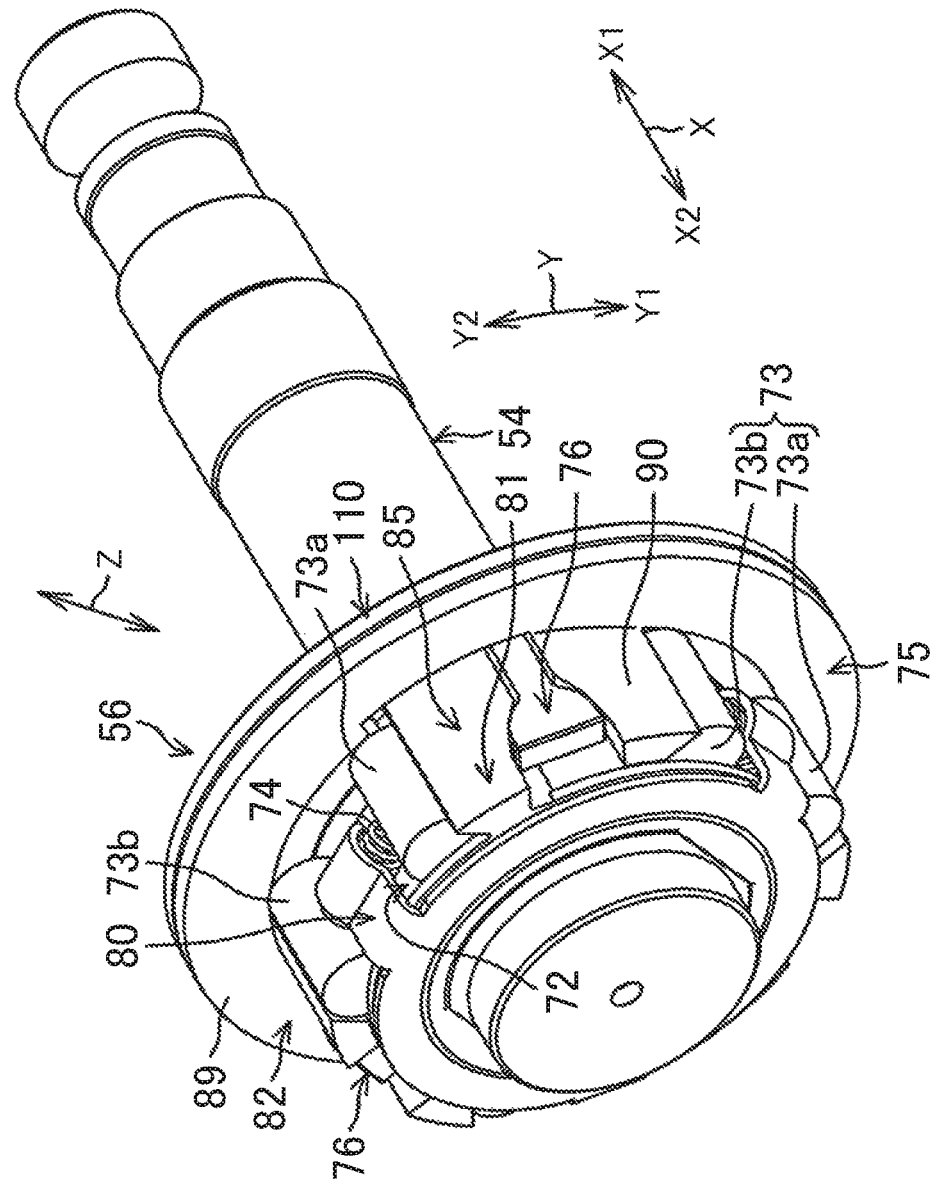
FIG. 3 is a perspective view depicting a configuration of a clutch mechanism.
Figure 4:
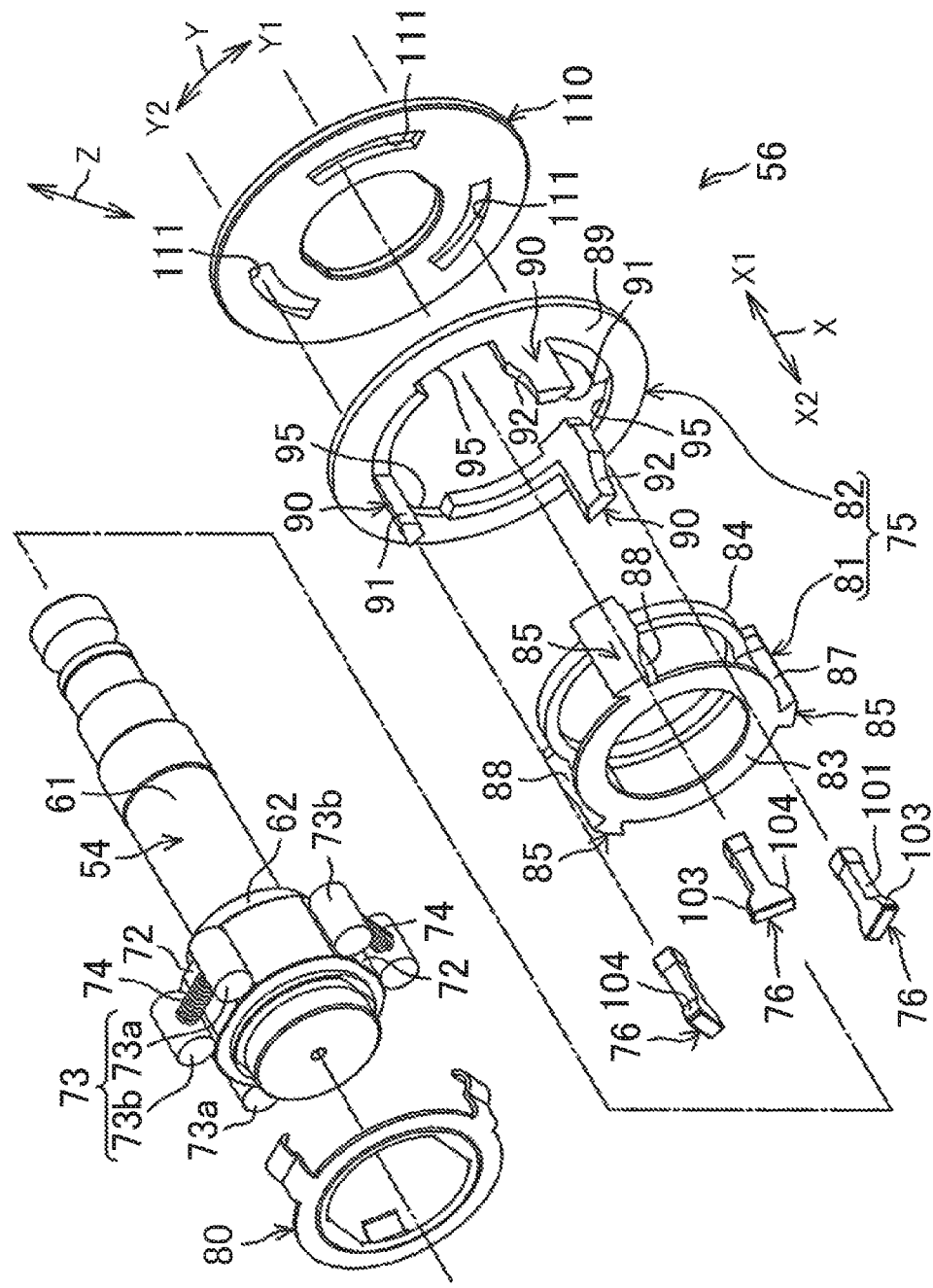
FIG. 4 is an exploded perspective view depicting the configuration of the clutch mechanism.

FIG. 3 is a perspective view depicting a configuration of the clutch mechanism 56. FIG. 4 is an exploded perspective view depicting the configuration of the clutch mechanism 56. In FIG. 3 and FIG. 4, illustration of the outer ring 55 is omitted. As seen in FIGS. 2 to 4, the clutch mechanism 56 is arranged between the inner ring 54 and the outer ring 55. The clutch mechanism 56 includes an inner peripheral surface 71, a plurality of cam surfaces 72, a plurality of roller pairs 73, a plurality of elastic members 74, a cage 75, wedge members 76, and a back plate 110. The inner peripheral surface 71 is cylindrically formed on the second annular step portion 64 of the outer ring 55. The cam surfaces 72 are formed on an outer peripheral surface of the large-diameter portion 62 of the inner ring 54.

Figure 8:
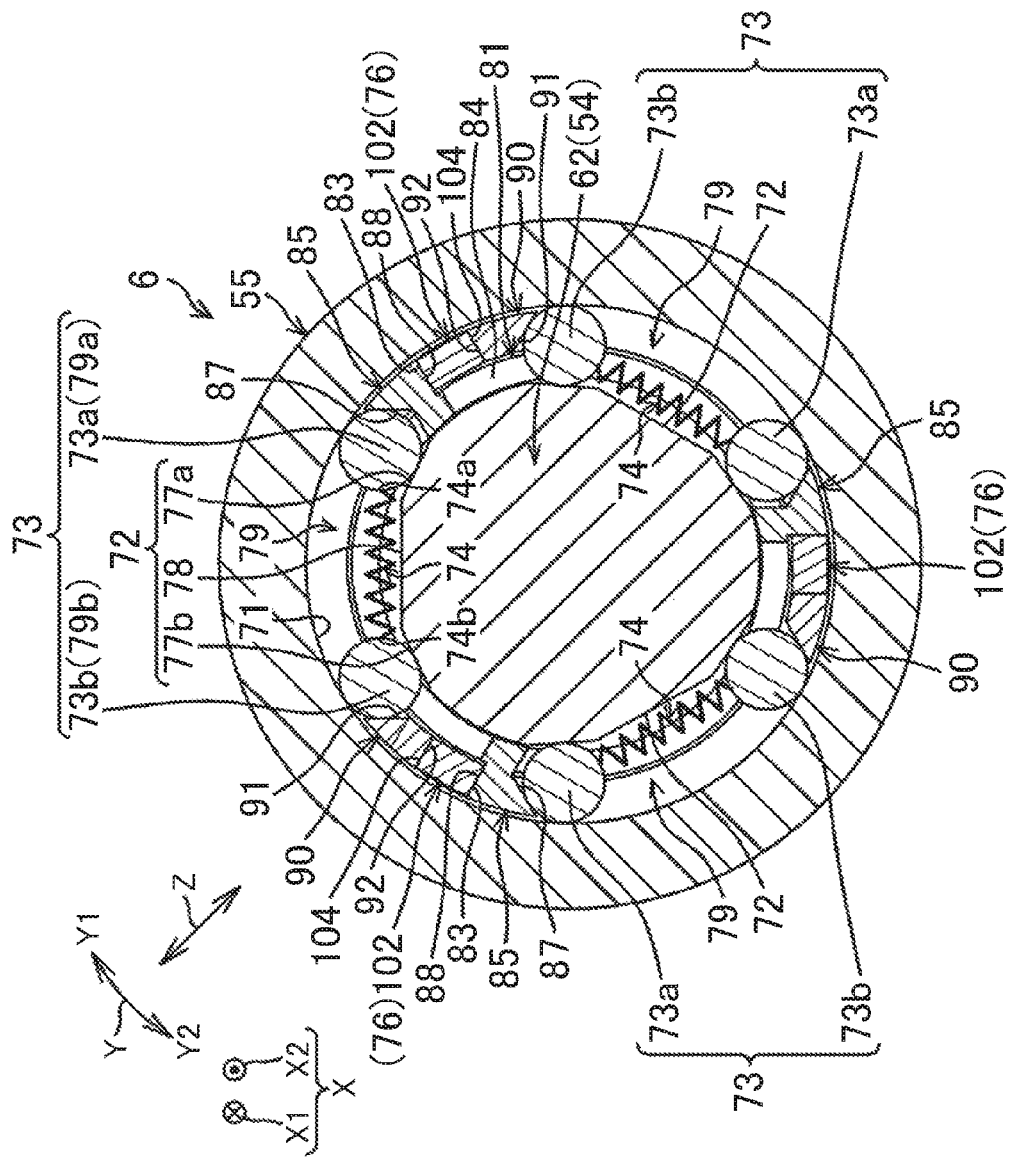
FIG. 8 is a sectional view taken along line VIII-VIII in FIG. 2.

FIG. 8 is a sectional view taken along line VIII-VIII in FIG. 2. FIG. 8 illustrates that the clutch mechanism is engaged. Three cam surfaces 72 are arranged on an outer peripheral surface of the inner ring 54 at regular intervals in the circumferential direction Y. As depicted in FIG. 8, the inner peripheral surface 71 of the outer ring 55 faces the cam surfaces 72 of the inner ring 54. Each of the cam surfaces 72 includes a pair of inclined surfaces 77a and 77b and a spring support surface 78. The inclined surfaces 77a and 77b are inclined in opposite directions with respect to the circumferential direction Y. The spring support surface 78 is provided between the inclined surfaces 77a and 77b and has a flat surface orthogonal to the radial direction Z. Wedge spaces 79 are each formed between the corresponding cam surface 72 and the inner peripheral surface 71 of the outer ring 55. The length (thickness) of each of the wedge spaces 79 in the radial direction Z decreases toward opposite ends of the wedge space 79 in the circumferential direction Y. The cam surfaces 72 may be formed on the inner peripheral surface of the outer ring 55, and a cylindrical surface may be formed on the outer peripheral surface of the inner ring 54.

As depicted in FIG. 8, the roller pairs 73 are arranged in the respective wedge spaces 79. Each of the roller pairs 73 includes a first roller 73a and a second roller 73b arranged at a distance from each other in the circumferential direction Y. The second roller 73b is arranged on the Y2 direction side with respect to the first roller 73a. In each of the wedge spaces 79, the elastic member 74 is arranged which biases the first roller 73a and the second roller 73b in directions in which the first roller 73a and the second roller 73b are separated from each other.

The elastic members 74 are, for example, compression coil springs. As the elastic members 74, other types of springs such as a leaf spring or a rubber material may be used. One end 74a of each of the elastic members 74 biases the first roller 73a in the Y1 direction. The other end 74b of each of the elastic members 74 biases the second roller 73b in the Y2 direction. Each of the elastic members 74 is supported by the corresponding spring support surface 78. As depicted in FIG. 4, the elastic members 74 are held by the inner ring 54 by fitting an elastic-member cage 80 that supports all the elastic members 74 together over the inner ring 54.

Figure 6A:
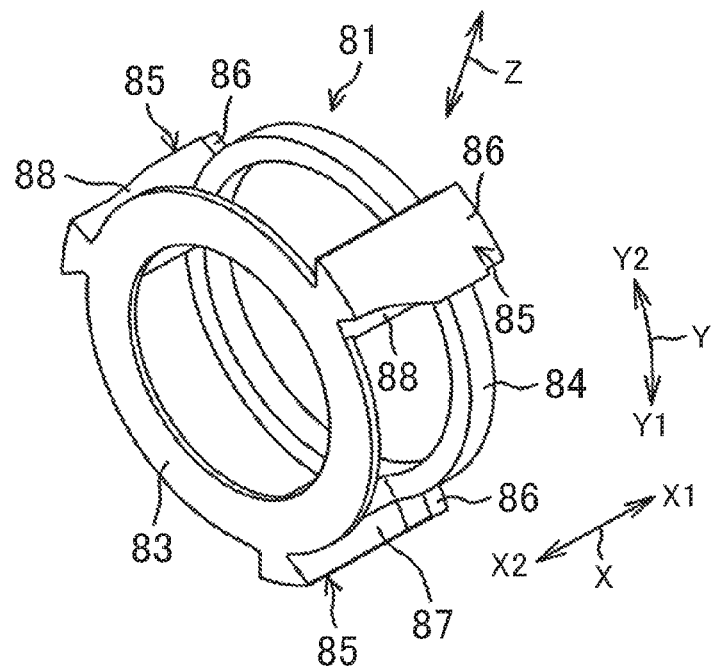
FIG. 6A and FIG. 6B are perspective views depicting a configuration of an inner cage.
Figure 6B:
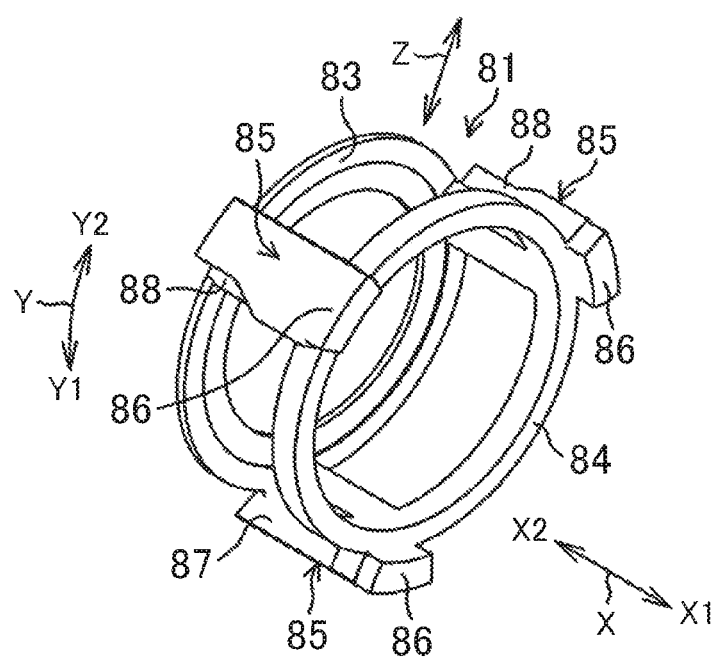

The cage 75 holds the roller pairs 73 and the elastic members 74. FIG. 5 is an exploded perspective view depicting a configuration of a part of the clutch mechanism 56. As depicted in FIGS. 3 to 5, the cage 75 includes an inner cage 81 and an outer cage 82. The inner cage 81 and the outer cage 82 are arranged so as to be rotatable relative to each other. FIG. 6A and FIG. 6B are perspective views depicting a configuration of the inner cage 81. As depicted in FIG. 6A and FIG. 6B, the inner cage 81 includes a first annular portion 83 shaped like a planar ring, a second annular portion 84 shaped like a ring, and a plurality of (in the present example, three) coupling portions 85. The second annular portion 84 is arranged coaxially with the first annular portion 83 and on the X1 direction side with respect to the first annular portion 83. The coupling portions 85 couple the first annular portion 83 and the second annular portion 84 together. The inner cage 81 is fitted over the large-diameter portion 62 of the inner ring 54 so as to be rotatable relative to the inner ring 54. The first annular portion 83 is in abutting contact with an X2 direction-side end surface of the large-diameter portion 62.

The coupling portions 85 are arranged at regular intervals in the circumferential direction Y. The first annular portion 83, the second annular portion 84, and the coupling portions 85 are integrally formed of a synthetic resin. The coupling portions 85 are shaped like pillars extending along the axial direction X. Each of the coupling portions 85 includes a first regulating protruding portion 86 that protrudes outward from the second annular portion 84 (in the X1 direction). The first regulating protruding portion 86 has a length in the axial direction X that is set approximately equal to the thickness of the back plate 110. On a Y2 direction-side surface of each of the coupling portions 85, a first abutting contact surface 87 is formed which can be brought into abutting contact with (can be pressed against) the first roller 73a.

On a Y1 direction-side surface of each of the coupling portions 85, a first sliding contacted surface 88 is formed which is brought into sliding contact with the corresponding wedge member 76. The first sliding contacted surface 88 is formed like an inclined surface that extends in the X1 direction inclined toward the Y1 direction side. In the present embodiment, the first sliding contacted surface 88 is formed like a recessed curved surface appearing like a circular arc or an ellipse as viewed in the radial direction Z.

Figure 7:
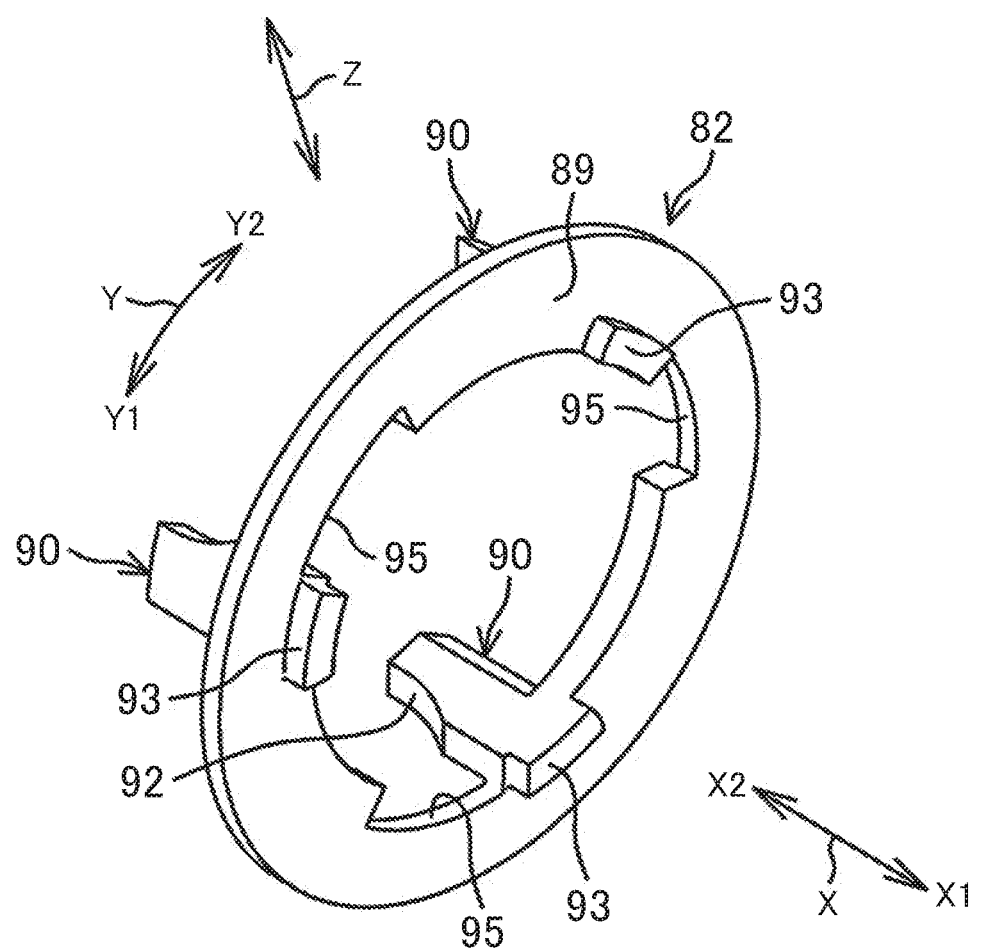
FIG. 7 is a perspective view depicting a configuration of an outer cage.

FIG. 7 is a perspective view depicting a configuration of the outer cage. As depicted in FIG. 7, the outer cage 82 has a third annular portion 89 shaped like a ring and a plurality of protruding portions 90. The protruding portions 90 protrude from an inner peripheral portion of the third annular portion 89 in the X2 direction. The third annular portion 89 is arranged to surround an outer periphery of the second annular portion 84. The protruding portions 90, which are identical in number to the roller pairs 73 (in the present example, three), are arranged at regular intervals in the circumferential direction Y. The third annular portion 89 and the protruding portions 90 are integrally formed of a synthetic resin material.

In an inner peripheral surface (inner peripheral edge) of the third annular portion 89, cutouts 95 recessed in the radial direction Z are each formed on a Y2 direction side of the corresponding protruding portion 90. Each of the cutouts 95 is a cutout through which the corresponding wedge member 76 and the corresponding coupling portion 85 of the inner cage 81 are inserted. On a Y1 direction-side surface of each of the protruding portions 90, a second abutting contact surface 91 is formed which can be brought into abutting contact with (can be pressed against) the second roller 73b. On a Y2 direction-side surface of each of the protruding portions 90, a second sliding contacted surface 92 is formed which is brought into sliding contact with the corresponding wedge member 76. The second sliding contacted surface 92 is formed like an inclined surface that extends in the X2 direction inclined toward the Y2 direction side. In the present embodiment, the second sliding contacted surface 92 is formed like a recessed curved surface appearing like a circular arc or an ellipse as viewed in the radial direction Z.

As depicted in FIG. 7, the third annular portion 89 is provided with second regulating protruding portions 93 located at the same positions as those of the protruding portions 90 and protruding in the X1 direction. The second regulating protruding portions 93 are provided integrally with the third annular portion 89. Each of the second regulating protruding portions 93 has a length in the axial direction X that is set approximately equal to the thickness of the back plate 110. As depicted in FIG. 3, the inner cage 81 and the outer cage 82 are combined together such that the coupling portions 85 and the protruding portions 90 are alternately arranged in the circumferential direction Y. Each of the roller pairs 73 is arranged between the corresponding coupling portion 85 and the protruding portion 90 located adjacently to and away from the coupling portion 85 in the Y2 direction. Each of the wedge members 76 is inserted between the corresponding coupling portion 85 and the protruding portion 90 located adjacently to and away from the coupling portion 85 in the Y1 direction. Each of the coupling portions 85 is provided with the corresponding first regulating protruding portion 86. The third annular portion 89 is provided with the second regulating protruding portions 93 at the same positions as those of the protruding portions 90. Each of the wedge members 76 is inserted between the corresponding first regulating protruding portion 86 and the corresponding second regulating protruding portion 93.

Figure 9A:
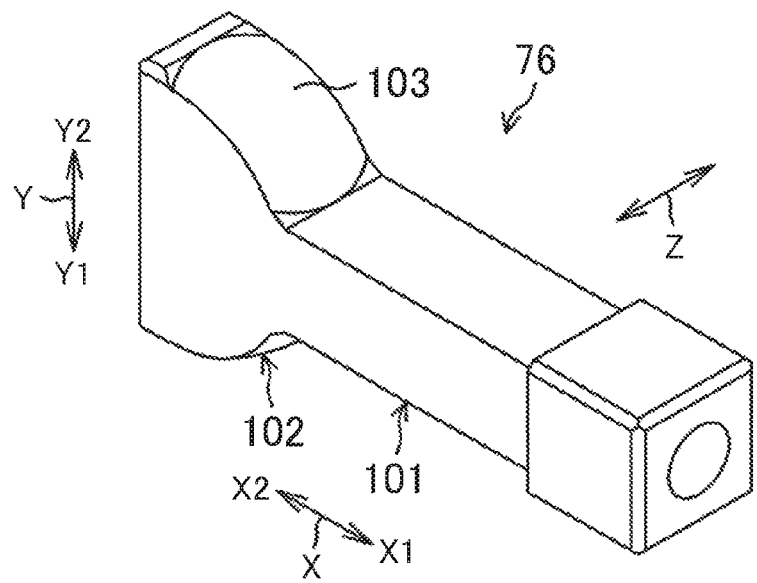
FIG. 9A and FIG. 9B are perspective views depicting a configuration of a wedge member.
Figure 9B:
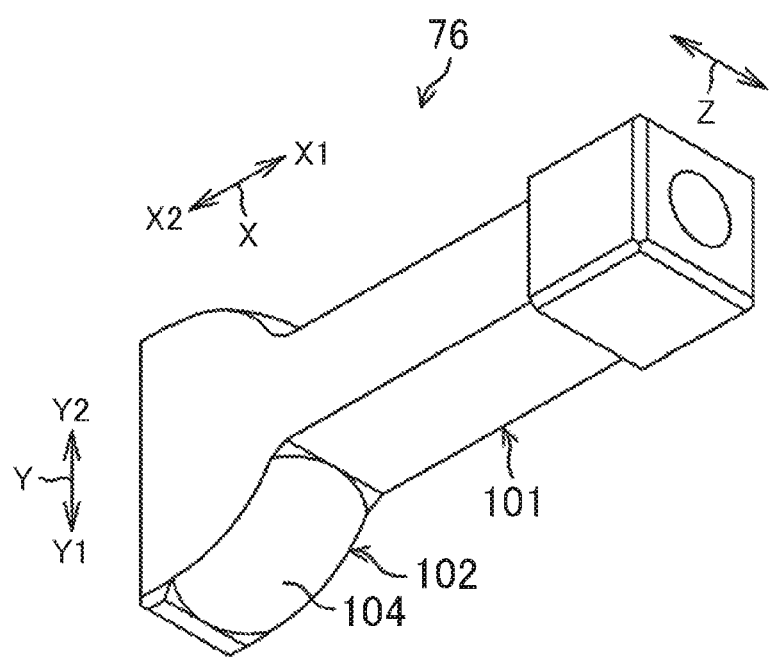

As depicted in FIG. 3 and FIG. 4, movement of the rollers 73a and 73b in the X1 direction is regulated by the second annular portion 84 of the inner cage 81 and the third annular portion 89 of the outer cage 82. Movement of the rollers 73a and 73b in the X2 direction is regulated by the first annular portion 83 of the inner cage 81. FIG. 9A and FIG. 9B are perspective views depicting a configuration of the wedge member 76. As seen in FIG. 9A and FIG. 9B, each of the wedge members 76 includes an insertion portion 101 with a rectangular cross section and a wedge portion 102. The insertion portion 101 extends along the axial direction X. The wedge portion 102 is provided at an X2 direction-side end of the insertion portion 101 and has a width (a width in the circumferential direction Y) increasing in the X2 direction. The wedge portion 102 includes a first sliding contact surface 103 provided on a Y2 direction-side surface of the wedge portion 102 and a second sliding contact surface 104 provided on a Y1 direction-side surface of the wedge portion 102.

The first sliding contact surface 103 is formed like an inclined surface that extends in the X1 direction inclined toward the Y1 direction side. In the present embodiment, the first sliding contact surface 103 is formed like a curved surface appearing like a part of a spherical surface. The second sliding contact surface 104 is formed like an inclined surface that extends in the X1 direction inclined toward the Y2 direction side. In the present embodiment, the second sliding contact surface 104 is formed like a curved surface appearing like a part of a spherical surface. The first and second sliding contact surfaces 103 and 104 may be formed like flat inclined surfaces.

As depicted in FIG. 2 and FIG. 5, the back plate 110 is shaped like a planar ring and is fixed to the inner ring 54 so as to be fitted over the shaft portion 61 of the inner ring 54. The back plate 110 is made of, for example, a steel material. An X2 direction-side surface of the back plate 110 is in sliding contact with each of the second and third annular portions 84 and 89. In the back plate 110, a plurality of (in the present embodiment, three) slots 111 is formed at regular intervals in the circumferential direction Y. The slots 111 penetrate the back plate 110 in the axial direction X. The slots 111 are formed so as to establish a one-to-one correspondence between the slots 111 and the wedge members 76. Each of the slots 111 is shaped like a circular arc that is elongate in the circumferential direction Y as viewed in the axial direction X. Each of the slots 111 has a flat, first inner wall surface (hereinafter referred to as a "first stopper surface 111a") on the Y2 direction side and a flat, second inner wall surface (hereinafter referred to as a "second stopper surface 111b") on the Y1 direction side.

Each of the slots 111 has a length in the circumferential direction Y that is set to a predetermined value larger than the total length of the three portions, i.e., the corresponding first regulating protruding portion 86, the corresponding second regulating protruding portion 93, and the insertion portion 101 of the corresponding wedge member 76, in the circumferential direction Y. The first regulating protruding portion 86, the second regulating protruding portion 93, and the insertion portion 101 of the wedge member 76 are inserted through each of the slots 111. The insertion portion 101 of the wedge member 76 penetrates the slot 111, and an X1 direction-side end of the insertion portion 101 extends in the X1 direction beyond the back plate 110.

As depicted in FIG. 2, the solenoid actuator 57 includes an annular armature 121, an annular rotor 122, and an electromagnet 123. The armature 121 is arranged on the X1 direction side of the back plate 110. The rotor 122 is arranged on the X1 direction side of the armature 121 so as to face the armature 121. The electromagnet 123 is arranged on the X1 direction side of the rotor 122. The armature 121 is provided so as to be rotatable and to be movable in the axial direction X with respect to the housing 58 and the inner ring 54. The X1 direction-side end of the insertion portion 101 of each of the wedge members 76 is coupled to the armature 121. The rotor 122 is fixed to the inner ring 54 so as to be fitted over the outer peripheral surface of the inner ring 54. The electromagnet 123 includes an annular electromagnetic coil 123a and an annular core 123b that supports the electromagnetic coil 123a. The core 123b is fixed to the housing 58. A third rolling bearing 124 is arranged between an inner peripheral surface of the core 123b and the input shaft 52. An X1 direction-side end of the input shaft 52 is supported by the housing 58 via the third rolling bearing 124 and the core 123b so as to be rotatable relative to the housing 58 and to be relatively immovable in the axial direction X.

Figure 10:
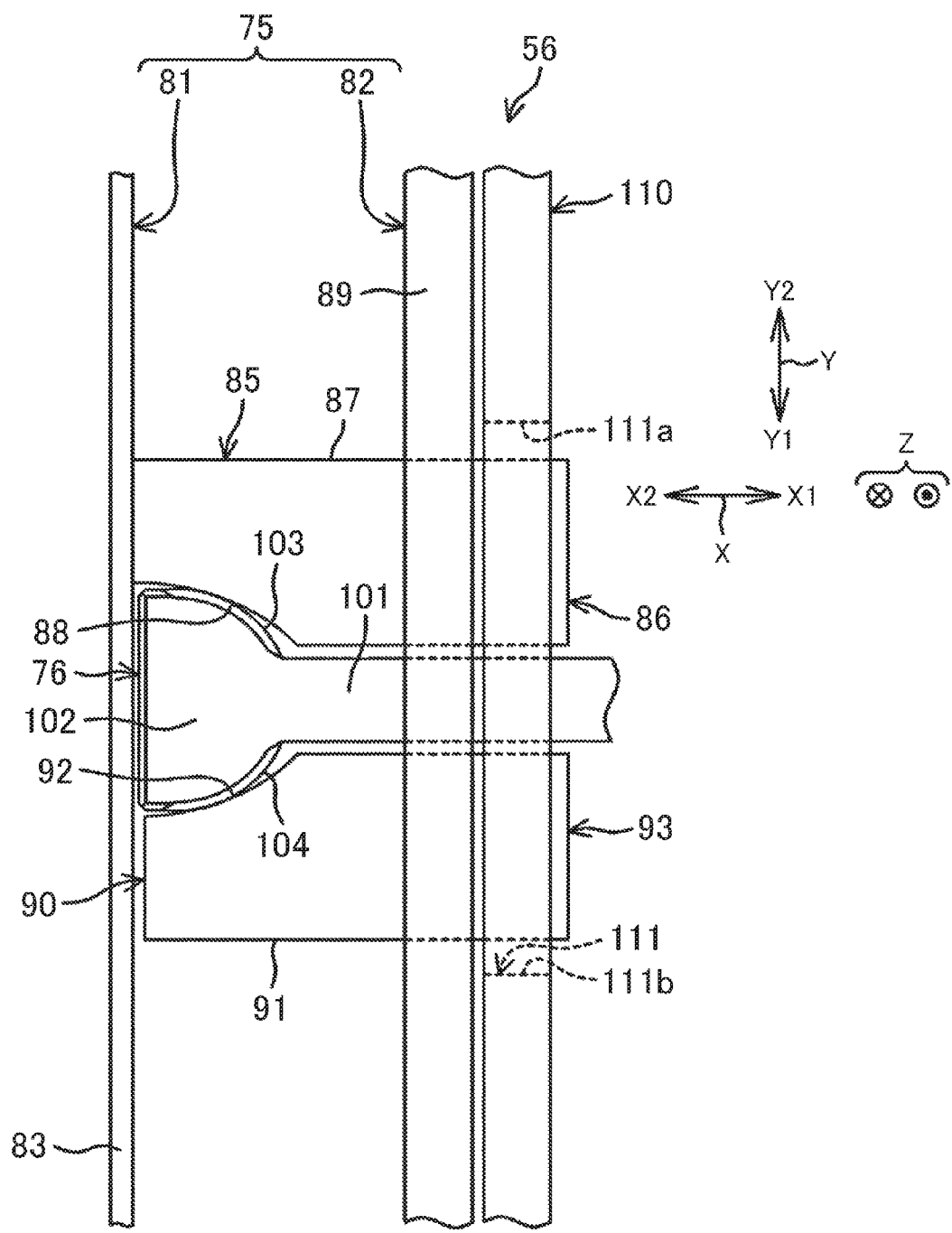
FIG. 10 is a side view illustrating a positional relationship among the wedge member, the inner cage, and the outer cage observed when the clutch mechanism is engaged.
Figure 11:
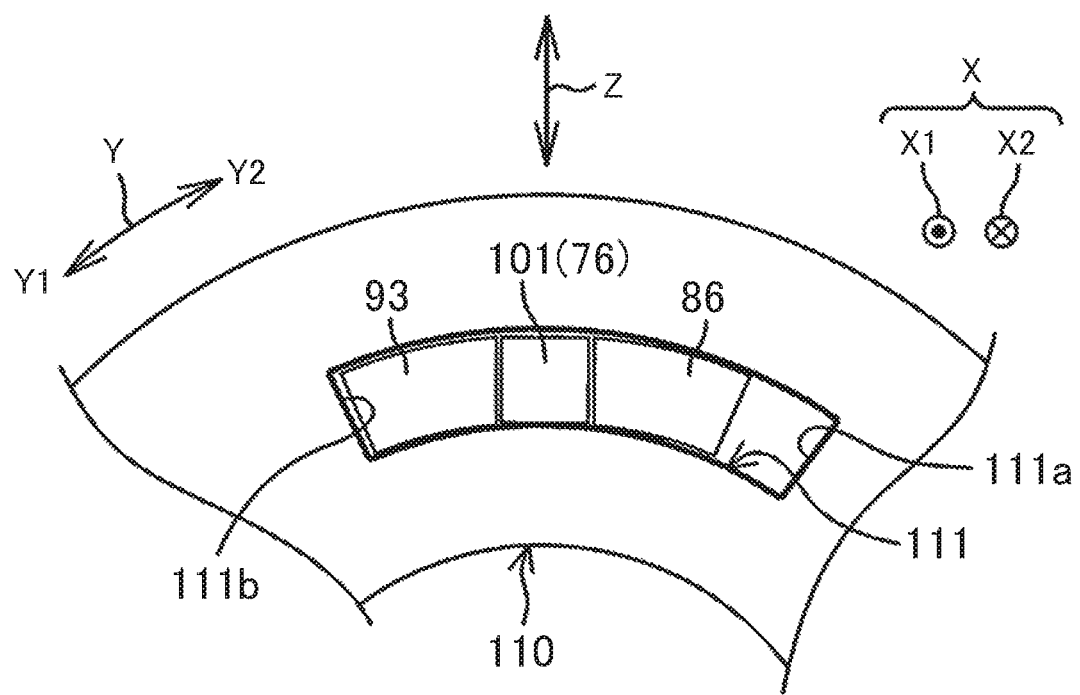
FIG. 11 is a front view illustrating a positional relationship among the wedge member, the inner cage, and the outer cage observed when the clutch mechanism is engaged.

FIG. 10 and FIG. 11 are a side view and a front view, respectively, depicting a positional relationship among the wedge member 76, the coupling portion 85 of the inner cage 81, and the protruding portion 90 of the outer cage 82 observed while the clutch mechanism 56 is engaged. FIG. 11 is a diagram as viewed from the X1 direction side. As depicted in FIG. 8, FIG. 10, and FIG. 11, while the electromagnet 123 is off, the armature 121 is not attracted by the electromagnet 123. Thus, the armature 121 is located in an initial position, and the wedge member 76 coupled to the armature 121 is located in a first position (initial position; the position of the wedge member 76 depicted in FIG. 10).

In this state, as depicted in FIG. 8, each of the first rollers 73a is held in a first engagement position 79a at a Y1 direction-side end of the corresponding wedge space 79 by a bias force of the corresponding elastic member 74. When held in the first engagement position 79a, the first roller 73a engages with the outer peripheral surface of the inner ring 54 (large-diameter portion 62) and the inner peripheral surface 71 of the outer ring 55 (second annular step portion 64). In this state, each of the second rollers 73b is held in a second engagement position 79b at a Y2 direction-side end of the corresponding wedge space 79 by a bias force of the corresponding elastic member 74. When held in the second engagement position 79b, the second roller 73b engages with the outer peripheral surface of the inner ring 54 (large-diameter portion 62) and the inner peripheral surface 71 of the outer ring 55 (second annular step portion 64). As described above, when the electromagnet 123 is off, the first and second rollers 73a and 73b engage with the outer peripheral surface of the inner ring 54 and the inner peripheral surface 71 of the outer ring 55, allowing the clutch mechanism 56 to be engaged.

Figure 12:
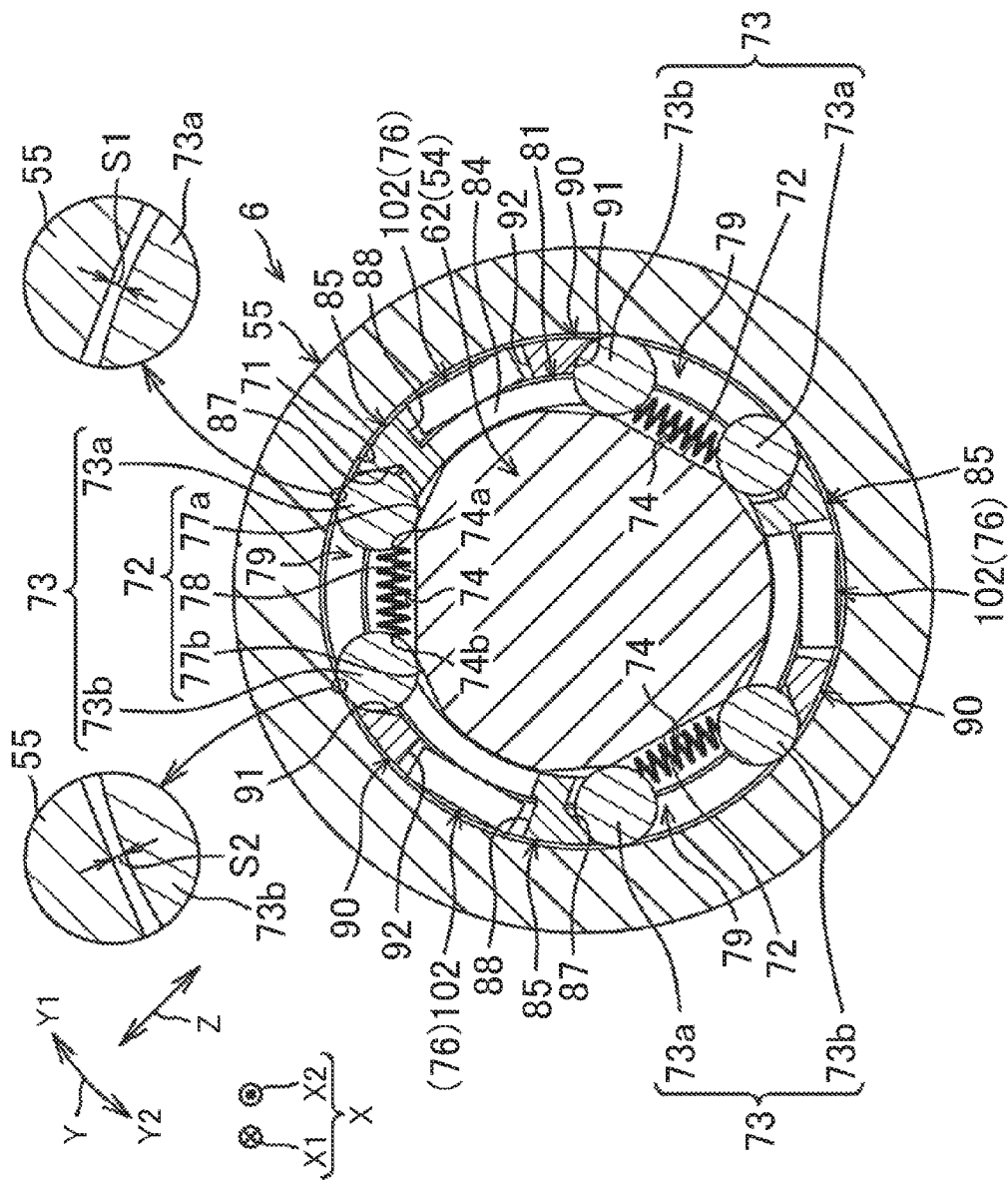
FIG. 12 is a sectional view illustrating that the clutch mechanism is released.
Figure 13:
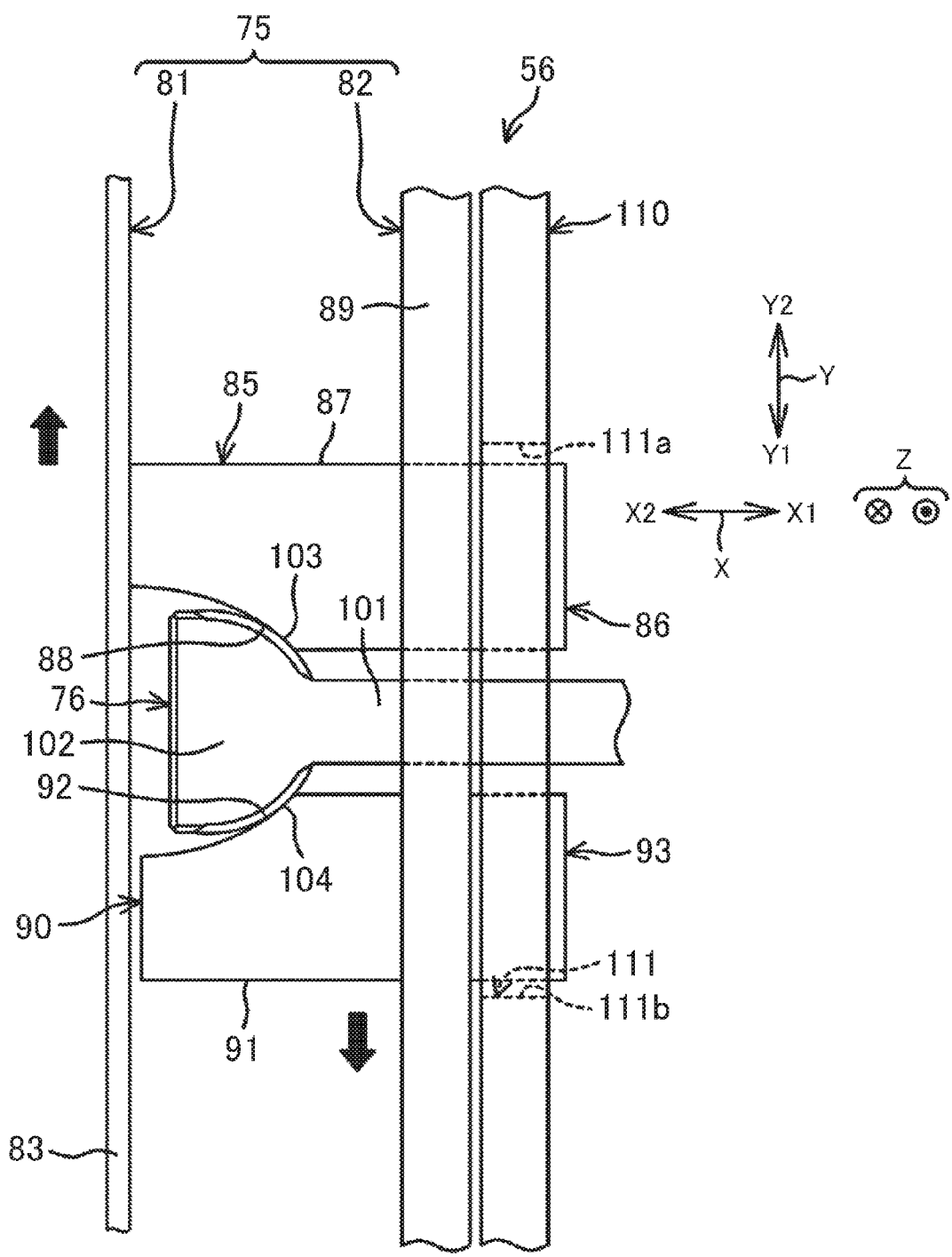
FIG. 13 is a side view illustrating a positional relationship among the wedge member, the inner cage, and the outer cage observed when the clutch mechanism is released.
Figure 14:
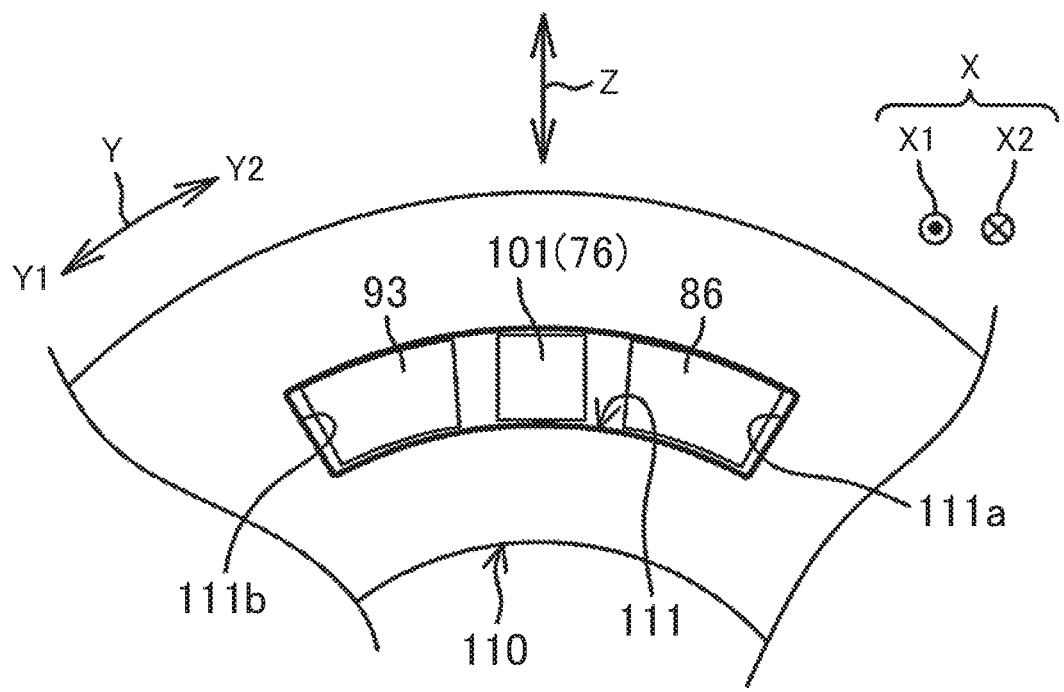
FIG. 14 is a front view illustrating a positional relationship among the wedge member, the inner cage, and the outer cage observed when the clutch mechanism is released.

On the other hand, FIG. 12 is a sectional view depicting the configuration of the clutch mechanism 56 in a state where the clutch mechanism 56 is released. FIG. 13 and FIG. 14 are a side view and a front view, respectively, depicting a positional relationship among the wedge member 76, the coupling portion 85 of the inner cage 81, and the protruding portion 90 of the outer cage 82 observed while the clutch mechanism 56 is engaged. FIG. 14 is a diagram as viewed from the X1 direction side. When the electromagnet 123 is switched on, the armature 121 is attracted by the electromagnet 123 as depicted in FIG. 13. Thus, the wedge members 76 coupled to the armature 121 are pulled in in the X1 direction. The pull-in causes each of the wedge members 76 to be moved to a second position (pull-in position; the position of the wedge member 76 depicted in FIG. 13) located on the X1 direction side with respect to the first position (the position of the wedge member 76 depicted in FIG. 10).

When each of the wedge members 76 moves in the X1 direction, the first sliding contact surface 103 of the wedge member 76 slides on the first sliding contacted surface 88 of the corresponding coupling portion 85 while pressing the coupling portion 85 in the Y2 direction. Consequently, the coupling portion 85 moves in the Y2 direction. Furthermore, when each of the wedge members 76 moves in the X1 direction, the second sliding contact surface 104 of the wedge member 76 slides on the second sliding contacted surface 92 of the corresponding protruding portion 90 while pressing the protruding portion 90 in the Y1 direction. Consequently, the protruding portion 90 moves in the Y1 direction.

That is, as each wedge member 76 moves in the X1 direction, the corresponding coupling portion 85 and the protruding portion 90 located adjacently to and away from the coupling portion 85 in the Y1 direction move in directions where the coupling portion 85 and the protruding portion 90 are separated from each other. As a result, the inner cage 81 pivots in the Y2 direction with respect to the wedge member 76, and the outer cage 82 pivots in the Y1 direction with respect to the wedge member 76. When the inner cage 81 and the outer cage 82 pivot with respect to the back plate 110, the second annular portion 84 of the inner cage 81 and the third annular portion 89 of the outer cage 82 each slide on the X2 direction-side surface of the back plate 110 in conjunction with pivoting of the inner cage 81 and the outer cage 82.

As the inner cage 81 pivots in the Y2 direction with respect to the wedge members 76, the coupling portions 85 move in the Y2 direction. As a result, the first abutting contact surfaces 87 of the coupling portions 85 press the corresponding first rollers 73a in the Y2 direction. Thus, the first rollers 73a move in the Y2 direction against the bias force of the elastic members 74. Consequently, each first roller 73a is detached from the first engagement position 79a (see FIG. 8). As a result, as depicted in FIG. 12, a gap S1 is formed between the each first roller 73a and the inner peripheral surface 71 of the outer ring 55. That is, the first rollers 73a are disengaged from the outer peripheral surface of the inner ring 54 and from the inner peripheral surface of the outer ring 55.

As the outer cage 82 pivots in the Y1 direction with respect to the wedge members 76, the protruding portions 90 move in the Y1 direction. As a result, the second abutting contact surfaces 91 of the protruding portions 90 press the corresponding second rollers 73b in the Y1 direction. Thus, the second rollers 73b move in the Y1 direction against the bias force of the elastic members 74. Consequently, each second roller 73b is detached from the second engagement position 79b (see FIG. 8). As a result, as depicted in FIG. 12, a gap S2 is formed between the each second roller 73b and the inner peripheral surface 71 of the outer ring 55. That is, the second rollers 73b are disengaged from the outer peripheral surface of the inner ring 54 and from the inner peripheral surface 71 of the outer ring 55.

Figure 15:
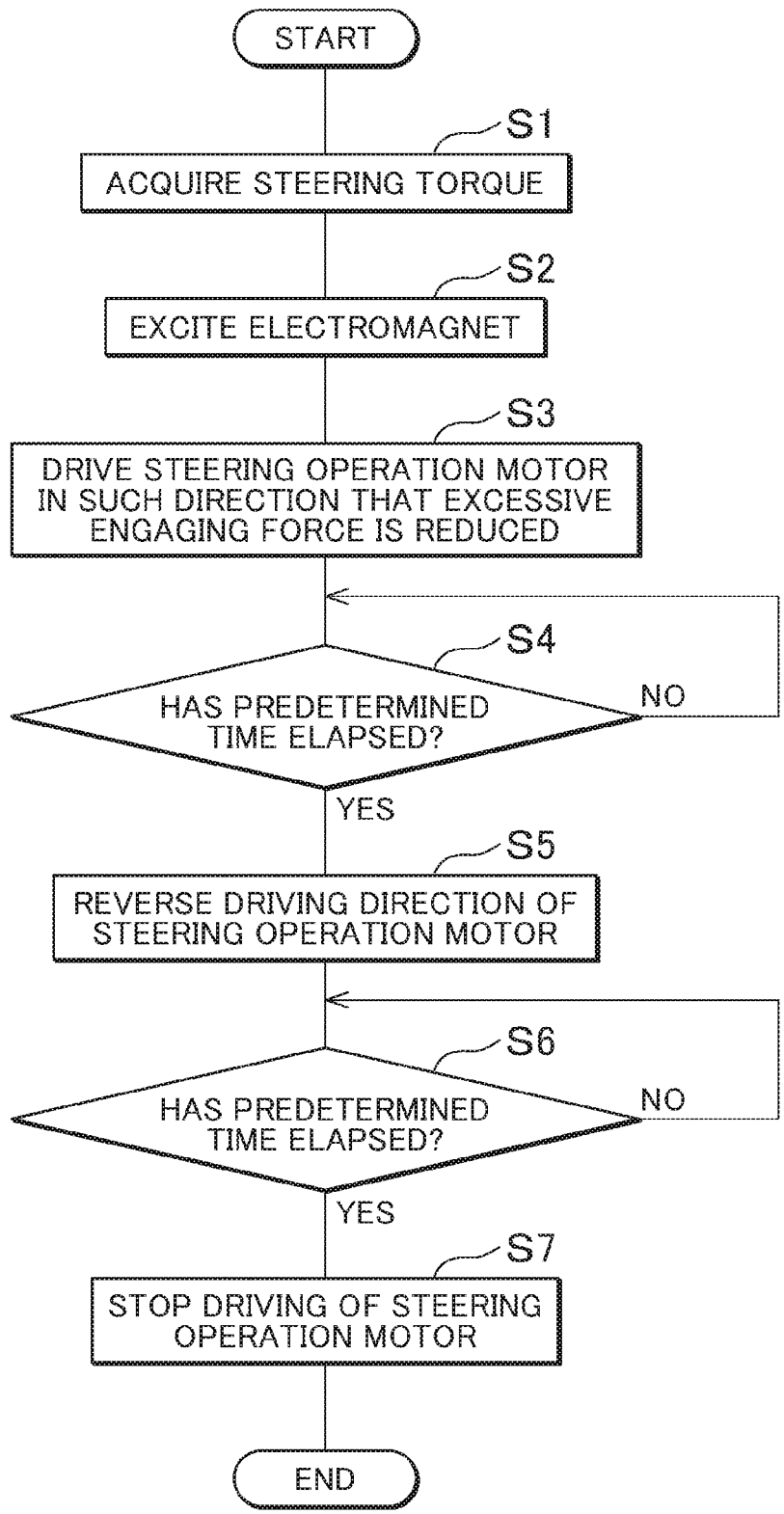
FIG. 15 is a flowchart illustrating a procedure of a clutch releasing process executed by an ECU in order to release the clutch.

As described above, when the electromagnet 123 is on, the rollers 73a and 73b are disengaged from the outer peripheral surface of the inner ring 54 (large-diameter portion 62) and from the inner peripheral surface 71 of the outer ring 55. Thus, the clutch mechanism 56 is released. FIG. 15 is a flowchart illustrating a procedure of a clutch releasing process executed by the ECU 40 in order to release the clutch 6.

The ECU 40 acquires a steering torque detected by the torque sensor 12 before the clutch releasing process is started (hereinafter referred to as a "detected steering torque T") (step S1). Then, the ECU 40 excites the electromagnet 123 of the solenoid actuator 57 (step S2). Then, the electromagnet 123 generates an electromagnetic force that attracts the armature 121 in the X1 direction.

The ECU 40 drives the steering operation motor 31 in accordance with the direction of the detected steering torque T acquired in step S1. First, the ECU 40 applies, to the output shaft 53, a torque acting in such a direction that an excessive engaging force being exerted on the clutch mechanism 56 is reduced (step S3). Specifically, based on the direction of the detected steering torque T acquired in step S1, the ECU 40 determines on which of the first and second rollers 73a and 73b the excessive engaging force is acting. The ECU 40 drives the steering operation motor 31 in such a direction that the engaging force applied to the rollers on which the excessive engaging force being exerted is reduced.

When a predetermined time has elapsed since the driving of the steering operation motor 31 in step S3 (step S4: YES), the ECU 40 reverses the driving direction of the steering operation motor 31 to apply a torque acting in the opposite direction to the output shaft 53 of the clutch 6 (step S5). When a predetermined time has elapsed since the reversal of the driving direction of the steering operation motor 31 in step S5 (step S6: YES), the ECU 40 stops the driving of the steering operation motor 31 (step S7). The ECU 40 keeps the electromagnet 123 excited. The ECU 40 ends the current clutch releasing process.

FIGS. 16A to 16C are schematic diagrams illustrating operations of the clutch mechanism 56 performed to release the clutch 6. FIGS. 16A to 16C depict a part of the clutch mechanism (the inner ring 54, the outer ring 55, the first roller 73a, the second roller 73b, the elastic member 74, the wedge member 76, the inner cage 81, the outer cage 82, the back plate 110, the armature 121, and the like). Upper portions of FIGS. 16A to 16C are schematic diagrams of the part of the clutch mechanism as viewed along the radial direction Z. Lower portions of FIGS. 16A to 16C are schematic diagrams of the part of the clutch mechanism as viewed along the axial direction X.

FIG. 16A depicts the state of the clutch mechanism 56 (engaged state) immediately before the start of the clutch releasing process. A torque (torsional force) acting in a direction depicted by arrow T0 is assumed to be being applied to the inner ring 54 with respect to the outer ring 55, with the first roller 73a biting in (firmly engaged) between the inner ring 54 and the outer ring 55. That is, an excessive engaging force is assumed to be being applied to each of the first rollers 73a of the clutch mechanism 56. In FIG. 16A, a normal force of a contact surface between the first roller 73a and the inner ring 54 is denoted by N1, a normal force of a contact surface between the first roller 73a and the outer ring 55 is denoted by N2, a normal force of a contact surface between the second roller 73b and the inner ring 54 is denoted by N3, and a normal force of a contact surface between the second roller 73b and the outer ring 55 is denoted by N4. A frictional force (engaging force) acting on each of the contact surfaces increases with an increase in the normal force N1, N2, N3, or N4 of the contact surface. In FIG. 16A, the normal forces N1 and N2 of the contact surfaces between the first roller 73a and the inner ring 54 and between the first roller 73a and the outer ring 55 are each higher than each of the normal forces N3 and N4 of the contact surfaces between the second roller 73b and the inner ring 54 and between the second roller 73b and the outer ring 55.

In this state, the electromagnet 123 of the solenoid actuator 57 is excited. Thus, the electromagnet 123 generates an electromagnetic force that attracts the armature 121 in the X1 direction. The steering operation motor 31 is driven in such a direction that the excessive engaging force (the normal forces N1 and N2 of the contact surfaces between the first roller 73a and both the inner and outer rings 54 and 55) being applied to each of the first rollers 73a of the clutch mechanism 56 is reduced. In this case, as depicted in FIG. 16B, the steering operation motor 31 is driven to apply, to the outer ring 55, a torque acting in a direction depicted by arrow T1. Consequently, the biting of the first roller 73a in between the inner ring 54 and the outer ring 55 is released. That is, this reduces the frictional forces between the first roller 73a and both the inner and outer rings 54 and 55 (the normal forces N1 and N2 of the contact surfaces between the first roller 73a and both the inner and outer rings 54 and 55), facilitating rotation of the inner cage 81 in the Y2 direction with respect to the inner ring 54. On the other hand, the torque T1 applied to the outer ring 55 by the steering operation motor 31 causes the second roller 73b to bite in (to be firmly engaged) between the inner ring 54 and the outer ring 55. This increases the frictional forces between the second roller 73b and both the inner and outer rings 54 and 55 (the normal forces N3 and N4 of the contact surfaces between the second roller 73b and both the inner and outer rings 54 and 55), hindering rotation of the outer cage 82 in the T1 direction with respect to the inner ring 54. As a result, as depicted in FIG. 16B, a force exerted by the electromagnet 123 to attract the armature 121 moves the wedge member 76 in the X1 direction, pivoting only the inner cage 81 (coupling portion 85) in the Y2 direction with respect to the inner ring 54. Thus, when the first regulating protruding portion 86 of the inner cage 81 comes into abutting contact with the first stopper surface 111a of the back plate 110, the pivoting of the inner cage 81 and the movement of the wedge member 76 are stopped. Consequently, the first roller 73a is disengaged from both the inner and outer rings 54 and 55.

Subsequently, the driving direction of the steering operation motor 31 is reversed. Thus, as depicted in FIG. 16C, a torque acting in a direction depicted by arrow T2 is applied to the outer ring 55. Thus, the biting of the second roller 73b in between the inner ring 54 and the outer ring 55 is released. That is, the frictional forces between the first roller 73a and both the inner and outer rings 54 and 55 (the normal forces N3 and N4 of the contact surfaces between the second roller 73b and both the inner and outer rings 54 and 55) decrease, facilitating rotation of the outer cage 82 in the T1 direction with respect to the inner ring 54. As a result, the wedge member 76 further moves in the X1 direction to pivot the outer cage 82 (protruding portion 90) in the Y1 direction with respect to the inner ring 54. When the second regulating protruding portion 93 of the outer cage 82 comes into abutting contact with the second stopper surface 111b of the back plate 110, the pivoting of the outer cage 82 and the movement of the wedge member 76 are stopped. Consequently, the second roller 73b is disengaged from both the inner and outer rings 54 and 55. Thus, the clutch 6 (clutch mechanism 56) is released. Subsequently, the driving of the steering operation motor 31 is stopped.

In the above-described embodiment, with the electromagnet 123 of the solenoid actuator 57 excited, the steering operation motor 31 is controllably driven to alternately apply the torques acting in the two different directions to the output shaft 53 of the clutch 6. Thus, even if an excessive engaging force is being applied to the clutch mechanism 56 when the clutch mechanism 56 is released, the clutch mechanism 56 can be released with the engaging force simultaneously weakened. In other words, even if biting of the clutch (biting of the first roller 73a in between the inner ring 54 and the outer ring 55 or biting of the second roller 73b in between the inner ring 54 and the outer ring 55) is occurring when the clutch mechanism 56 is released, the clutch mechanism 56 can be released with the biting simultaneously eliminated. Thus, an electromagnetic force needed to release the clutch mechanism 56 can be reduced. This enables a reduction in output from the electromagnet 123 and thus the size and power consumption of the clutch 6 can be reduced.

In the above-described embodiment, the torque acting in such a direction that the excessive engaging force being exerted on the clutch mechanism 56 is reduced is first applied to the output shaft 53 of the clutch 6. This enables a torque to be prevented from being applied in such a direction that the excessive engaging force being exerted on the clutch mechanism 56 is further increased, that is, in such a direction that biting of the clutch is enhanced. The embodiment of the invention has been described. However, the invention may be implemented in any other form. For example, in the above-described embodiment, to release the clutch 6, the ECU 40 controllably drives the steering operation motor 31 so as to first apply, to the output shaft 53, the torque acting in such a direction that the excessive engaging force being exerted on the clutch mechanism 56 is reduced and then to apply the torque acting in the opposite direction to the output shaft 53. However, the ECU 40 may controllably drive the steering operation motor 31 so as to first apply a torque acting in a preset direction to the output shaft 53 and then to apply a torque acting in the opposite direction to the output shaft 53. In this case, to release the engaged clutch 6, the ECU 40 need not acquire the steering torque T detected by the torque sensor 12.

In the above-described embodiment, to release the clutch 6, the ECU 40 controllably drives the steering operation motor 31 so as to apply the torques acting in the two different directions to the output shaft 53 one at a time. However, to release the clutch 6, the ECU 40 may controllably drive the steering operation motor 31 so as to apply the torques acting in two different directions to the output shaft 53 alternately and multiple times. To release the clutch 6, the ECU 40 may drive the steering operation motor 31 at a high frequency to apply vibration to the clutch mechanism 56.

To release the clutch 6, the ECU 40 may controllably drive the reaction force motor 14 instead of the steering operation motor 31 or may controllably drive both the steering operation motor 31 and the reaction force motor 14.

In the above-described embodiment, the steering operation angle θr of the steered wheels 3 is detected based on the axial moving distance of the rack shaft 17 detected by the stroke sensor 37. However, the steering operation angle θr of the steered wheels 3 may be detected based on the rotation angle detected by the rotation angle sensor 36.

Various modifications may be made to the design of the embodiment within the scope of the claims.

What is claimed is:

1. A vehicular steering system comprising:
   a steering member for steering a vehicle;
   a steering operation mechanism that allows steered wheels to be steered;
   a reaction force motor that applies a reaction force to the steering member;
   a steering operation motor that drives the steering operation mechanism;
   a motor control unit that controllably drives the reaction force motor and the steering operation motor;
   an input shaft coupled to the steering member;
   an output shaft coupled to the steering operation mechanism;

a clutch mechanism that transmits and blocks a torque between the input shaft and the output shaft;

a solenoid actuator that has a function to generate an electromagnetic force for releasing the clutch mechanism and allows the clutch mechanism to be engaged and released; and an actuator control unit that drives the solenoid actuator to generate an electromagnetic force for releasing the clutch mechanism, wherein the motor control unit includes:
- a unit that controllably drives at least one of the reaction force motor and the steering operation motor while the solenoid actuator is being driven by the actuator control unit when the clutch mechanism is released from an engaged state, to alternately apply, to at least one of the input shaft and the output shaft, torques acting in two different directions in which the output shaft is rotated relative to the input shaft.

2. The vehicular steering system according to claim 1, further comprising a torque acquiring unit that acquires a steering torque applied to the steering member, wherein the motor control unit is configured to determine a direction of the torque that is first applied to at least one of the input shaft and the output shaft based on a direction of the steering torque acquired by the torque acquiring unit.

3. The vehicular steering system according to claim 2, wherein the motor control unit is configured to controllably drive the steering operation motor to alternately apply torques acting in two different directions to the output shaft.

4. The vehicular steering system according to claim 1, wherein the motor control unit is configured to drive at least one of the reaction force motor and the steering operation motor at a high frequency to alternately apply torques acting in two different directions to at least one of the input shaft and the output shaft.

5. The vehicular steering system according to claim 4, wherein the motor control unit is configured to controllably drive the steering operation motor to alternately apply torques acting in two different directions to the output shaft.

6. The vehicular steering system according to claim 1, wherein the motor control unit is configured to controllably drive the steering operation motor to alternately apply torques acting in two different directions to the output shaft.

* * * * *